(12) United States Patent
Johnston et al.

(10) Patent No.: US 7,862,956 B2
(45) Date of Patent: Jan. 4, 2011

(54) Z-AXIS ELECTRICALLY CONDUCTING FLOW FIELD SEPARATOR

(75) Inventors: Raymond P. Johnston, Lake Elmo, MN (US); Mark K. Debe, Stillwater, MN (US); Haiyan Zhang, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1599 days.

(21) Appl. No.: 11/025,246

(22) Filed: Dec. 29, 2004

(65) Prior Publication Data

US 2006/0141328 A1     Jun. 29, 2006

(51) Int. Cl.
*H01M 4/64* (2006.01)
*H01M 4/66* (2006.01)

(52) U.S. Cl. ........................ 429/518; 429/517; 429/519; 429/520; 429/521; 429/522

(58) Field of Classification Search ............... 429/34–39
See application file for complete search history.

(56) References Cited

U.S. PATENT DOCUMENTS

| | | | |
|---|---|---|---|
| 3,505,114 A | | 4/1970 | Rohr |
| 5,733,678 A | * | 3/1998 | Ledjeff et al. .................. 429/30 |
| 5,776,624 A | * | 7/1998 | Neutzler ....................... 429/26 |
| 5,879,827 A | | 3/1999 | Debe et al. |
| 6,255,012 B1 | * | 7/2001 | Wilson et al. .................. 429/38 |
| 6,482,763 B2 | | 11/2002 | Haugen et al. |
| 2002/0127459 A1 | | 9/2002 | Lenz et al. |
| 2002/0182475 A1 | * | 12/2002 | Pan .............................. 429/41 |
| 2003/0152821 A1 | * | 8/2003 | Lisi et al. ....................... 429/34 |
| 2003/0232234 A1 | | 12/2003 | Cisar et al. |
| 2004/0033410 A1 | | 2/2004 | Brady et al. |
| 2004/0101738 A1 | * | 5/2004 | Tawfik et al. .................. 429/38 |
| 2004/0107869 A1 | | 6/2004 | Velamakanni et al. |

FOREIGN PATENT DOCUMENTS

| | | |
|---|---|---|
| EP | 1 211 742 A2 | 6/2002 |
| EP | 1 227 531 A1 | 7/2002 |
| EP | 0 956 604 B1 | 5/2003 |
| EP | 1 478 043 A1 | 11/2004 |
| WO | WO 00/02277 A2 | 1/2000 |
| WO | WO 01/11704 A1 | 2/2001 |
| WO | WO 02/096638 A1 | 12/2002 |
| WO | WO 2004/062019 A1 | 7/2004 |
| WO | WO 2004/066425 A2 | 8/2004 |
| WO | WO 2005/006472 A1 | 1/2005 |
| WO | WO 2005/104285 A2 | 11/2005 |

\* cited by examiner

*Primary Examiner*—Dah-Wei D Yuan
*Assistant Examiner*—Steven Scully
(74) *Attorney, Agent, or Firm*—Philip Y. Dahl

(57) ABSTRACT

A flexible flow field separator includes a substrate layer formed of a flexible material and having first and second surfaces. A structured flow field pattern is defined on the first surface of the substrate layer. The structured flow field pattern defines one or more fluid channels. The separator includes a first layer formed of one or more metals and disposed on the first surface of the substrate layer. The first layer is formed of an electrically conductive material. The separator further includes a second layer disposed on the second surface of the substrate layer. The second layer is formed of a flexible electrically conductive material. The first layer contacts the second layer at one or more locations to define an electrical connection between the first and second layers.

30 Claims, 12 Drawing Sheets

Z-AXIS ELECTRICALLY CONDUCTING FLOW FIELD SEPARATOR

FIELD OF THE INVENTION

The present invention relates generally to a fluid transport film that is electrically conductive in the z-axis direction.

BACKGROUND OF THE INVENTION

A typical fuel cell system includes a power section in which one or more fuel cells generate electrical power. A fuel cell is an energy conversion device that converts hydrogen and oxygen into water, producing electricity and heat in the process. Each fuel cell unit may include a proton exchange member at the center with gas diffusion layers on either side of the proton exchange member. Anode and cathode catalyst layers are respectively positioned at the inside of the gas diffusion layers. This unit is referred to as a membrane electrode assembly (MEA). Separator plates or flow field plates are respectively positioned on the outside of the gas diffusion layers of the membrane electrode assembly. This type of fuel cell is often referred to as a PEM fuel cell.

The reaction in a single fuel cell typically produces less than one volt. A plurality of the fuel cells may be stacked and electrically connected in series to achieve a desired voltage. Electrical current is collected from the fuel cell stack and used to drive a load. Fuel cells may be used to supply power for a variety of applications, ranging from automobiles to laptop computers.

SUMMARY OF THE INVENTION

The present invention is directed to a flow field separator. In accordance with one embodiment, a flexible flow field separator includes a substrate layer formed of a flexible material and having first and second surfaces. A structured flow field pattern is defined on the first surface of the substrate layer. The structured flow field pattern defines one or more fluid channels. The separator includes a first layer formed of one or more metals and disposed on the first surface of the substrate layer. The first layer is formed of an electrically conductive material. The separator further includes a second layer disposed on the second surface of the substrate layer. The second layer is formed of a flexible electrically conductive material. The first layer contacts the second layer at one or more locations to define an electrical connection between the first and second layers.

Another embodiment is directed to a method of fabricating a flexible flow field separator. The method includes providing a second layer formed of a flexible electrically conductive material. A second surface of a polymeric substrate layer is placed in contact with the second layer. The second and substrate layers are laminated under pressure and optionally temperature so as to develop a structured flow field pattern on a first surface of the polymeric substrate layer. A first layer of an electrically conductive material is coated on the first surface of the polymeric substrate layer, such that the first layer contacts the second layer at one or more locations to establish an electrical connectivity between the first and second layers.

Yet another embodiment of the invention is directed to a flexible flow field separator having a toughness of greater than about 20 degrees, measured in accordance with the toughness test described herein, and a mean bulk density of less than about 4.5.

A further embodiment of the invention involves a method of repairing a fuel cell stack. The fuel cell stack includes one or more flow field separators having a substrate layer formed of a flexible material and having first and second surfaces. A structured flow field pattern is defined on the first surface of the substrate layer. The structured flow field pattern defines one or more fluid channels. The separator includes a first layer formed of one or more metals and disposed on the first surface of the substrate layer. The first layer is formed of an electrically conductive material. The separator further includes a second layer disposed on the second surface of the substrate layer. The second layer is formed of a flexible electrically conductive material. The first layer contacts the second layer at one or more locations to define an electrical connection between the first and second layers.

According to one aspect of the invention, a faulty unitized cell assembly is detected. The compression is removed from the plurality of unitized cell assemblies of the fuel cell stack and the faulty unitized cell assembly is replaced. While maintaining the unitized cell assembly to unitized cell assembly registration, the correct compression is reapplied to the plurality of unitized cell assemblies.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1A:
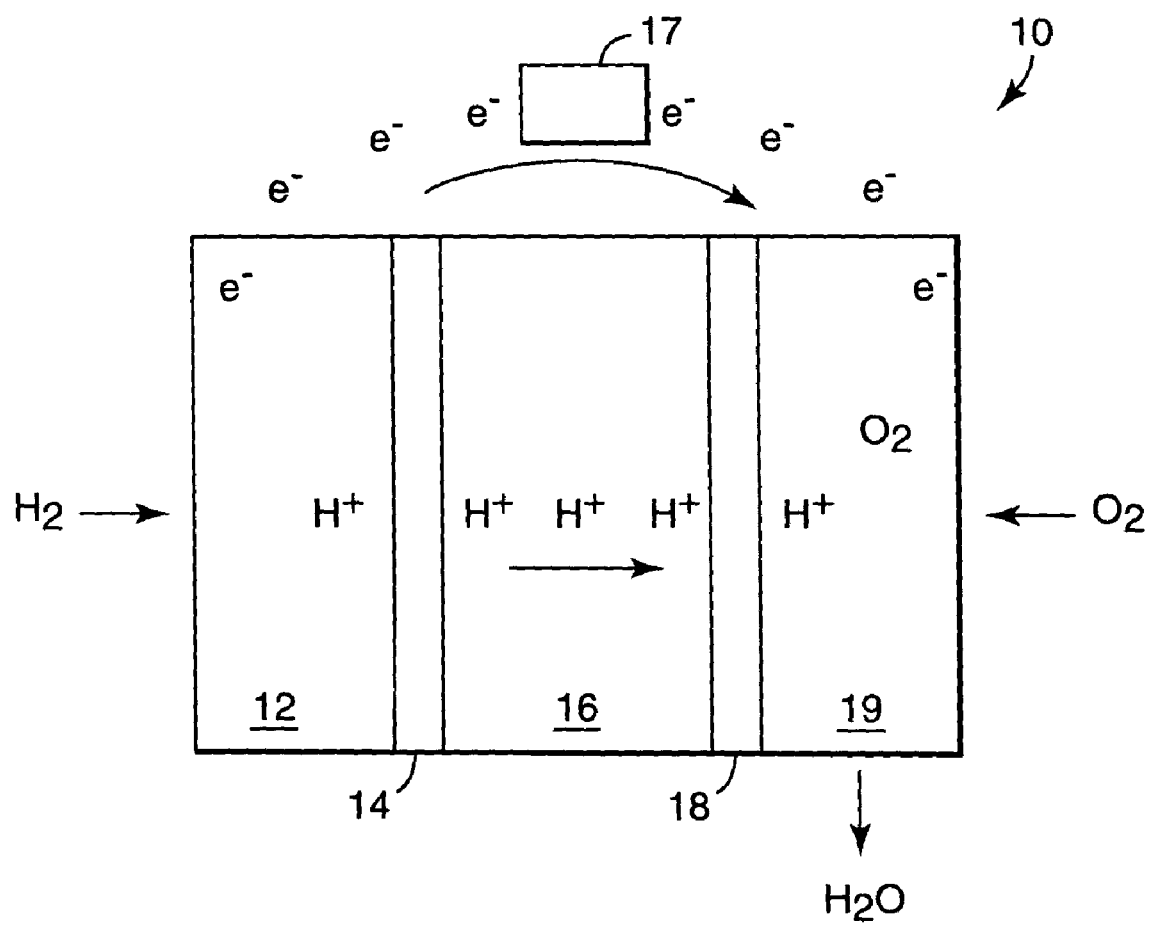
FIG. 1a is an illustration of a fuel cell and its constituent layers.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings that form a part hereof, and in which is shown by way of illustration, various embodiments in which the invention may be practiced. It is to be understood that the embodiments may be utilized and structural changes may be made without departing from the scope of the present invention.

The present invention is directed to a flow field film, denoted herein as a flow field separator that provides for z-axis electrical conduction between the surfaces of the separator. The separator comprises a flexible substrate having a structured flow field pattern defined on at least one surface. First and second conductive layers are disposed on the surfaces of the substrate with the first layer making electrical contact with the second layer via apertures or conduction paths through the substrate at one or more locations.

It is recognized that for certain applications, such as automotive traction stacks, there are limitations with existing PEM Fuel Cells due to excessive weight, volume and/or cost. A significant reason for this is due to the thickness and weight of the flow field separators. Machined graphite, carbon composite, and metals are materials commonly used for flow field separators. These material options may suffer from either excessive volume or weight. This limitation leads to heavy or bulky fuel cell stacks, as typically there are many separators in each stack. Furthermore, it is difficult to make these separators thin and robust. Breakage and cracking have been issues with graphite and carbon composite based separators. Small defects can lead to breakage and catastrophic failures. Thin, light weight metal plate separators can bend easily and remain deformed. There have been many attempts to improve the performance of flow field separators, but it has been difficult to find a good balance between cost, thickness, weight, and toughness. The present invention addresses these issues, with a cost effective and robust solution to these limitations. The present invention also provides a method to cost effectively manufacture separators for PEM fuel cell stacks. A continuous film based method is provided, as well as cost effective molding methods. These methods present new opportunities to manufacture PEM fuel cells, which are more cost effective and industrialized.

The efficacy of the fuel cell power system also depends on the integrity of the various contacting and sealing interfaces within individual fuel cells of the fuel cell stack. Such contacting and sealing interfaces include those associated with the transport of fuels, coolants, and effluents within and between fuel cells of the stack. Proper positional alignment of fuel cell components and assemblies within a fuel cell stack is critical to ensure efficient operation of the fuel cell system. Misalignment of fuel cell components resulting from handling during assembly of fuel cell sub-assemblies, for example, can lead to failure of individual fuel cells and degradation of fuel cell system performance. This need extends to sub assemblies as well. Unitized Cell Assemblies (UCA) require precision alignment, sealing and bonding.

The separator of the present invention is particularly useful for forming bipolar or unipolar flow field separators used for fuel cell applications. Although the flow field separator according to the present invention is particularly advantageous in the context of fuel cell assemblies, it will be appreciated that the principles of the present invention may be implemented in a wide variety of applications. Accordingly, the specific illustrative embodiments described below are for purposes of explanation, and not of limitation.

The separator films described in the examples provided below may be used to efficiently transport reactants and by-products, conduct thermal energy, and minimize resistive current losses in a versatile and cost effective manner. Other types of flow field plates, such as those using machined graphite, molded conductive carbon composite polymers, lithographically etched plates, and formed metal plates, each suffer some significant performance or cost limitation. The present invention is directed to a versatile and cost-effective z-axis electrically conductive fluid transport film providing very thin, tough, flexible and lightweight flow field uni and bipolar separators.

In addition to the basic performance parameters, some of the embodiments described herein describe flow field separators that are flexible and may be formed by continuous processing techniques. The flexible separators described herein may be made as discrete components or in a continuous roll.

The separator in accordance with embodiments of the present invention comprises a fluidic structure that may be made from a material that has some elasticity, allowing the separator to provide conformability and improved gasketing. In some embodiments, the separator includes an integral gasket feature that may be used in place of separate seals. In some embodiments, the separator can facilitate the movement of three distinct fluid regions, accommodating, for example, a coolant and two reactant streams. Such a configuration is particularly useful for forming a bipolar flow field separator with integral cooling for fuel cell applications.

A flow field separator of the present invention may be incorporated in fuel cell assemblies and stacks of varying types, configurations, and technologies. A typical fuel cell is depicted in FIG. 1a. A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

The fuel cell 10 shown in FIG. 1a includes a first diffuser/current collector (DCC) 12 adjacent an anode 14. Adjacent the anode 14 is an electrolyte membrane 16. A cathode 18 is situated adjacent the electrolyte membrane 16, and a second diffuser/current collector 19 is situated adjacent the cathode 18. In operation, hydrogen fuel is introduced into the anode portion of the fuel cell 10, passing through the first diffuser/current collector 12 and over the anode 14. At the anode 14, the hydrogen fuel is separated into hydrogen ions ($H^+$) and electrons ($e^-$).

The electrolyte membrane 16 permits only the hydrogen ions or protons to pass through the electrolyte membrane 16 to the cathode portion of the fuel cell 10. The electrons cannot pass through the electrolyte membrane 16 and, instead, flow through an external electrical circuit in the form of electric current. This current can power an electric load 17, such as an electric motor, or be directed to an energy storage device, such as a rechargeable battery.

Oxygen flows into the cathode side of the fuel cell 10 via the second diffuser/current collector 19. As the oxygen passes over the cathode 18, oxygen, protons, and electrons combine to produce water and heat.

Individual fuel cells, such as that shown in FIG. 1a, can be packaged as unitized fuel cell assemblies as described below. The unitized fuel cell assemblies, referred to herein as unitized cell assemblies (UCAs), can be combined with a number of other UCAs to form a fuel cell stack. The UCAs may be electrically connected in series with the number of UCAs within the stack determining the total voltage of the stack, and the active surface area of each of the cells determines the total current. The total electrical power generated by a given fuel cell stack can be determined by multiplying the total stack voltage by total current.

A number of different fuel cell technologies can be employed to construct UCAs in accordance with the principles of the present invention. For example, one or more flow field separators of the present invention can be employed to construct proton exchange membrane (PEM) fuel cell assemblies. PEM fuel cells operate at relatively low temperatures (about 175° F./80° C.), have high power density, can vary their output quickly to meet shifts in power demand, and are well suited for applications where quick startup is required, such as in automobiles for example.

The proton exchange membrane used in a PEM fuel cell is typically a thin solid polymer electrolyte sheet that allows hydrogen ions to pass through it, but yet separates the gaseous reactants. The membrane is typically coated on both sides with highly dispersed metal or metal alloy particles (e.g., platinum or platinum/ruthenium) that are active catalysts. The electrolyte used is typically a solid perfluorinated sulfonic acid polymer. Use of a solid electrolyte is advantageous because it reduces corrosion and electrolyte containment problems.

Hydrogen is fed to the anode side of the fuel cell where the catalyst promotes the hydrogen atoms to release electrons and become hydrogen ions (protons). The electrons travel in the form of an electric current that can be utilized before it returns to the cathode side of the fuel cell where oxygen has been introduced. At the same time, the protons diffuse through the membrane to the cathode, where the hydrogen ions are recombined and reacted with oxygen to produce water.

A membrane electrode assembly (MEA) is the central element of PEM fuel cells, such as hydrogen fuel cells. As discussed above, typical MEAs comprise a polymer electrolyte membrane (PEM) (also known as an ion conductive membrane (ICM)), which functions as a solid electrolyte.

One face of the PEM is in contact with an anode catalyst electrode layer and the opposite face is in contact with a cathode catalyst electrode layer. Each electrode layer includes electrochemical catalysts, typically including platinum metal. Diffuser/current collectors facilitate gas transport to and from the anode and cathode electrode materials and conduct electrical current from the catalyst layers to the separator or flow field films.

In a typical PEM fuel cell, protons are formed at the anode via hydrogen oxidation and transported to the cathode to react with oxygen, allowing electrical current to flow in an external circuit connecting the electrodes.

The DCC may also be called a gas diffusion layer (GDL). The anode and cathode electrode layers may be applied to the PEM or to the DCC during manufacture, so long as they are disposed between PEM and DCC in the completed MEA.

Any suitable PEM may be used in the practice of the present invention. Useful PEM thicknesses range between about 200 μm and about 15 μm. The PEM is typically comprised of a polymer electrolyte that is an acid-functional fluoropolymer, such as Nafion® (DuPont Chemicals, Wilmington Del.), Flemion® (Asahi Glass Co. Ltd., Tokyo, Japan), and polymers having a highly fluorinated backbone and recurring pendant groups according to the formula $YOSO_2—CF_2—CF_2—CF_2—CF_2—O$-[polymer backbone] where Y is $H^+$ or another monovalent cation, such as an alkali metal cation. The latter polymers are described in WO2004062019. The polymer electrolytes useful in the present invention are typically preferably copolymers of tetrafluoroethylene and one or more fluorinated, acid-functional comonomers.

Typically, the polymer electrolyte bears sulfonate functional groups. The polymer electrolyte typically has an acid equivalent weight of 1200 or less, more typically 1100, and most typically about 1000. Equivalent weights as low as 800 or even 700 might be used.

Any suitable DCC may be used in the practice of the present invention. Typically, the DCC is comprised of sheet material comprising carbon fibers. The DCC is typically a carbon fiber construction selected from woven and non-woven carbon fiber constructions. Carbon fiber constructions which may be useful in the practice of the present invention may include: Toray Carbon Paper, SpectraCarb Carbon Paper, AFN non-woven carbon cloth, Zoltek Carbon Cloth, and the like. The DCC may be coated or impregnated with various materials, including carbon particle coatings, hydrophilizing treatments, and hydrophobizing treatments such as coating with polytetrafluoroethylene (PTFE).

Any suitable catalyst may be used in the practice of the present invention, including platinum blacks or fines, ink containing carbon-supported catalyst particles (as described in US 20040107869 and herein incorporated by reference), or nanostructured thin film catalysts (as described in U.S. Pat. Nos. 6,482,763 and 5,879,827, both incorporated herein by reference). The catalyst may be applied to the PEM or the DCC by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Direct methanol fuel cells (DMFC) are similar to PEM cells in that they both use a polymer membrane as the electrolyte. In a DMFC, however, the anode catalyst itself draws the hydrogen from liquid methanol fuel, eliminating the need for a fuel reformer. DMFCs typically operate at a temperature between 40-90° C. A direct methanol fuel cell can utilize one or more flow field separators configured in accordance with the principles of the present invention.

Figure 1B:
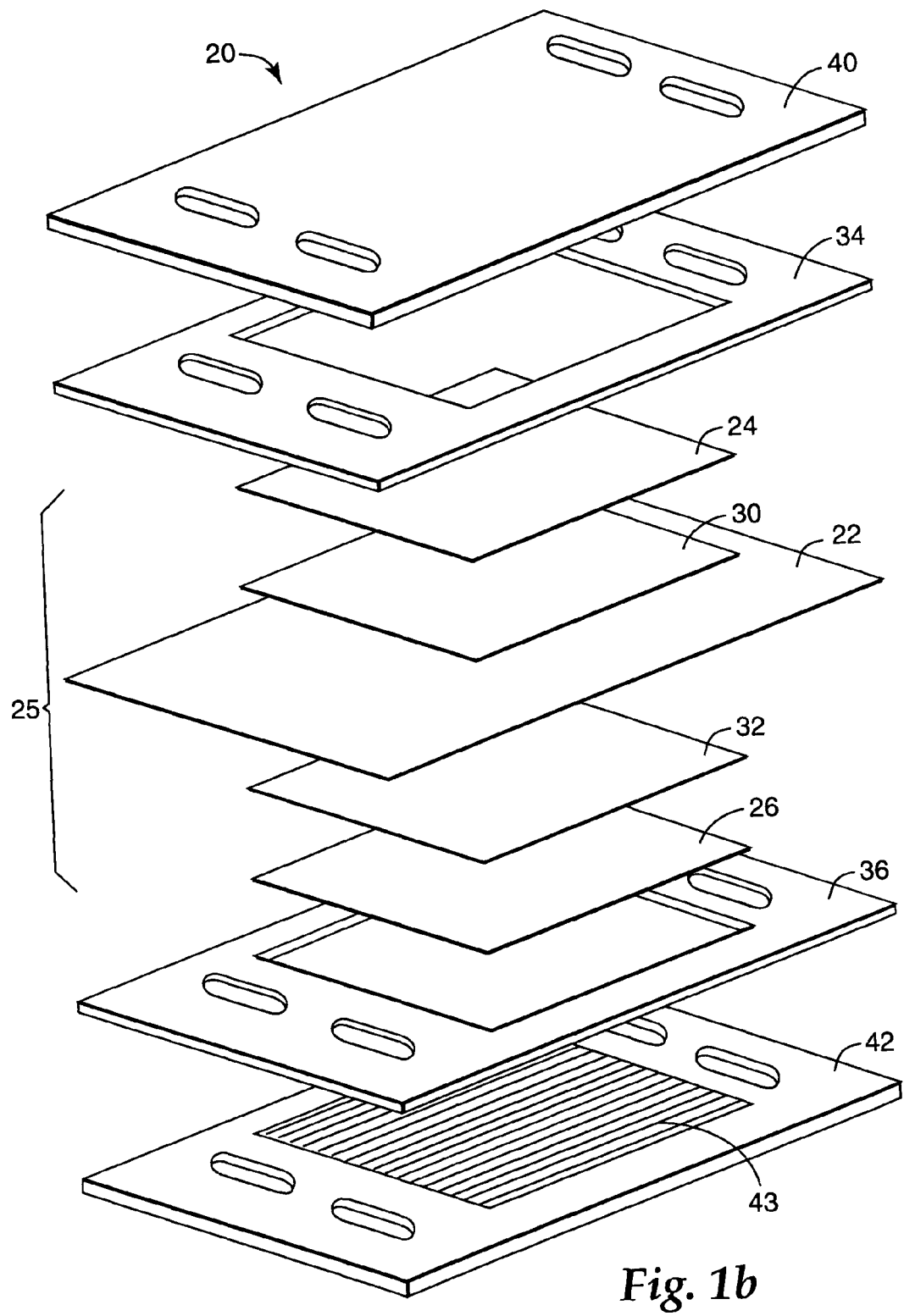
FIG. 1b illustrates a unitized cell assembly including flow field separators configured in accordance with embodiments of the present invention.

Referring now to FIG. 1b, there is illustrated an embodiment of a UCA implemented in accordance with a PEM fuel cell technology. As is shown in FIG. 1b, a membrane electrode assembly (MEA) 25 of the UCA 20 includes five component layers. A PEM layer 22 is sandwiched between DCC layers 24 and 26, or gas diffusion layers (GDLs) for example. An anode catalyst 30 is situated between a first DCC 24 and the membrane 22, and a cathode catalyst 32 is situated between the membrane 22 and a second DCC 26.

In one configuration, a PEM layer 22 is fabricated to include an anode catalyst coating 30 on one surface and a cathode catalyst coating 32 on the other surface. This structure is often referred to as a catalyst-coated membrane or CCM. According to another configuration, the first and second DCCs 24, 26 are fabricated to include an anode and cathode catalyst coating 30, 32, respectively. In yet another configuration, an anode catalyst coating 30 can be disposed partially on the first DCC 24 and partially on one surface of the PEM 22, and a cathode catalyst coating 32 can be disposed partially on the second DCC 26 and partially on the other surface of the PEM 22.

The DCCs 24, 26 are typically fabricated from a carbon fiber paper or non-woven material or woven cloth. Depending on the product construction, the DCCs 24, 26 can have carbon particle coatings on one side. The DCCs 24, 26, as discussed above, can be fabricated to include or exclude a catalyst coating.

In the particular embodiment shown in FIG. 1b, MEA is shown sandwiched between a first edge seal system 34 and a second edge seal system 36. The edge seal systems 34, 36 provide the necessary sealing within the UCA package to isolate the various fluid (gas/liquid) transport and reaction regions from contaminating one another and from inappropriately exiting the UCA 20, and may further provide for electrical isolation and hard stop compression control between flow field separator films 40, 42. In the example illustrated in FIG. 1b, flow field films 40 and 42 are positioned adjacent the first and second edge seal systems 34 and 36, respectively. In some embodiments described herein, flow field separators are configured to provide an integral gasket in place of the edge seal systems 34, 36.

Each of the flow field films 40, 42 includes a field of gas flow channels 43 and ports through which hydrogen and oxygen feed fuels pass. The flow field films 40, 42 may also incorporate coolant channels and ports. The coolant channels may be incorporated on surfaces of the flow field films 40, 42 opposite the surfaces incorporating the gas flow channels 43.

In the configuration depicted in FIG. 1b, flow field films 40, 42 are configured as unipolar flow field separators, in which a single MEA 25 is sandwiched there between. The UCA configuration shown in FIG. 1b is representative of a particular arrangement that can be implemented for use in the context of flow field separator methodology in accordance with the present invention. This arrangement is provided for illustrative purposes only, and is not intended to represent all possible configurations coming within the scope of the present invention. Rather, FIG. 1b is intended to illustrate various components that can be selectively incorporated into a particular fuel cell assembly design.

Aspects of the invention are directed to a unipolar or bipolar flow field separator films. The unipolar or bipolar flow field films configured as describe herein are particularly useful in making fuel cell assemblies or sub-assemblies. Aspects of the invention are further directed to fuel cell stacks that are built by stacking sub-units of multiple cell assemblies (MCAs) or UCAs together, where each MCA (or UCA) module is itself a "short-stack" that incorporates at least one membrane electrode assembly (MEA) and at least two bipolar or unipolar flow field separators (or mixed pairs of bipolar and unipolar flow field separators).

Figure 2:
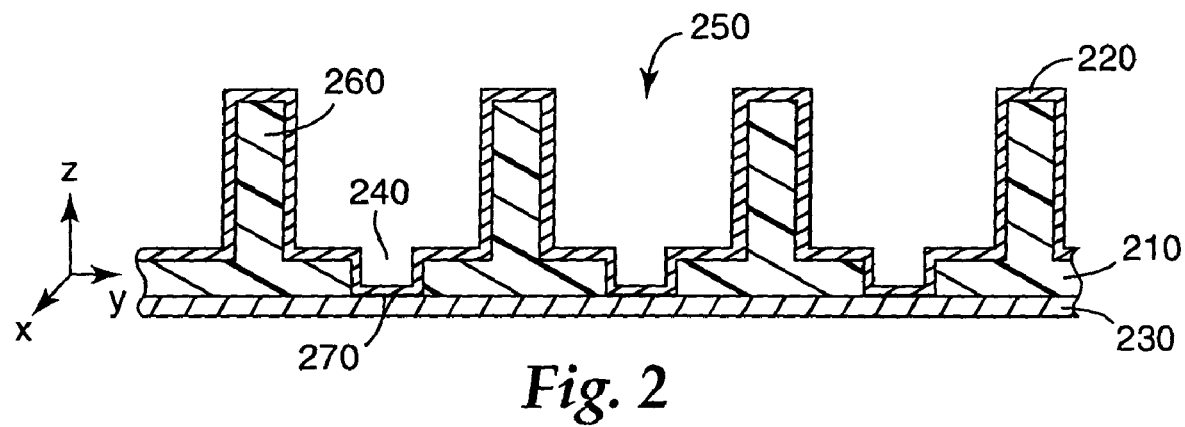
FIG. 2 illustrates a cross section of a flow field separator in accordance with embodiments of the present invention.

FIG. 2 illustrates a cross section of a flow field separator in accordance with embodiments of the present invention. The flow field separator in FIG. 2 may be used, for example, as a unipolar flow field film in fuel cell applications. The flow field separator includes a flexible substrate layer 210 that may be formed of a polymeric material, such as a polymer having good dimensional stability and low coefficient of thermal expansion. For example, the polymer may be selected from materials such as polymethylmethacrylate, polypropylene and polycarbonate, where polycarbonate is preferable.

First and second electrically conductive layers 220, 230 are disposed on opposing surfaces of the substrate 210. In some implementations, an adhesive layer may be disposed between the substrate 210 and the second layer 230. For example, the adhesive layer may comprise a rubber, silicone, or acrylic based adhesive. Other adhesive layers can also be contemplated, including epoxies, isocyanates and the like. The substrate 210 may comprise one or more films and may be electrically non-conductive or have an electrical conductivity substantially less than the first and the second layers. The second layer 230 may be flexible and comprise one or more electrically conductive films and/or foils, such as an aluminum foil. The first layer 220 may be formed of an electrically conductive coating of one or more metals, such as nickel. In some implementations an adhesion promoting layer may be employed between the first layer 220 and the substrate 210. For example, the adhesion promoting layer may comprise a sputtered or vapor coated metallic layer. Some examples of the adhesion promoting layer could include nickel, or chrome/nickel metal layers, or combinations of metal films in the thickness range of a submonolayer to several tens or hundreds of nanometers.

The separator includes interconnection zones 270 that provide for electrical contact between the first 220 and the second 230 layers. The zones 270 are arranged so that the first conductive layer 220 is electrically connected to the second conductive layer 230 in several smaller discrete regions and/or in one or more larger continuous regions. The zones 270 are arranged so that the separator can carry a substantial current without significant resistive electrical losses through the z-axis of the separator. The interconnection zones 270 between the first and the second layers 220, 230 may provide for an area specific resistance of between about 0.001 ohm-cm$^2$ and about 0.1 ohm-cm$^2$.

The substrate 210 includes a flow field pattern of features 260 forming at least one channel 250 and one aperture 240. The flow field pattern may define a structured flow field pattern on the surface of the substrate 210. The channels 250 provide for transport of fuel reactants, by-products, and/or coolant across surface of the separator. The channel or channels 250 of the flow field may define various patterns, including a serpentine pattern, a curved pattern, and/or a linear pattern across the surface of the substrate 210.

The substrate features 260 and/or apertures 240 are preferably formed by molding, but may be formed by other processes. The apertures 240 in the substrate 210 facilitate formation of the zones 270 of interconnection between the first 220 and the second 230 layers. The apertures 240 may be formed by molding, laminating, laser cutting, perforation of the substrate, or other processes.

The first electrically conductive layer 220 may be comprised of one or more metals and conformally coats the features 260 of one surface of the substrate 210. For example, the first layer 220 may comprise a galvanically formed metallic skin that conforms to the surface of the substrate features 260. The first layer 220 may have a thickness of about 3 mils, with a preferred thickness of about 1.5 to 2 mil, however the thickness can range from about 0.1 mils to a thickness of more than 5 mils. The thickness of the first layer 220 is preferably thin relative to the features 260 and/or channels 250 of the substrate 210. Typical channel 250 dimensions can range from about 1 mil to about 100 mil, and more preferably from about 3 mil to about 50 mil, and more preferably from about 10 mil to about 35 mil. Generally, the first layer 220 will remain thin compared to the channel 250 and it may be desirable to keep the first layer 220 as thin as possible.

The second electrically conductive layer 230 is disposed at an opposite surface of the substrate 210 from the first electrically conductive layer 220. The second layer 230 may comprise a flexible, electrically conductive material, such as a metal foil like nickel, aluminum, or stainless steel. The second layer 230 may optionally be formed of a flexible form of graphite such as GRAPHOIL, or another electrically conductive and flexible material.

As previously described, the substrate 210 includes apertures 240 through which electrical interconnections 270 are made between the first 220 and the second 230 layers. In one embodiment, the apertures 240 may be formed by a molding process used to form the channel features 260, or may be formed in a separate process step. For example, the apertures 240 may be formed by perforating a replicated substrate film that is subsequently laminated to the second layer 230. Alternatively, the apertures 240 may optionally be formed after either laminating or molding the substrate onto the second layer 230. The first layer 220 is conformally deposited on the surface of the substrate 210 making electrical contact with the second layer through the apertures 240 at the interconnection zones 270.

The substrate 210 may be formed of a material that may be, but is not necessarily, electrically conductive. If the substrate is electrically conductive, the z-axis electrical conductivity of the separator is enhanced over the z-axis electrical conductivity provided by the interconnection zones 270 alone. Because the first and second conductive layers 220, 230 adjacent to the structured substrate 210 described above are conformal layers, the fluidic channels can be small. This feature is very useful in fuel cells since the flow field can then be made thin, further encouraging compact unipolar or bipolar flow field films and fuel cell design.

As described in more detail below, a toughness measure may be used to gauge the resistance of the separator to catastrophic breakage. For example, the separator formed in accordance with embodiments of the present invention may have a toughness test value of greater than about 20 degrees, measured in accordance with the toughness test described herein, typically while maintaining a mean bulk density of less than about 4.5 gm/cm$^3$.

Figure 3:
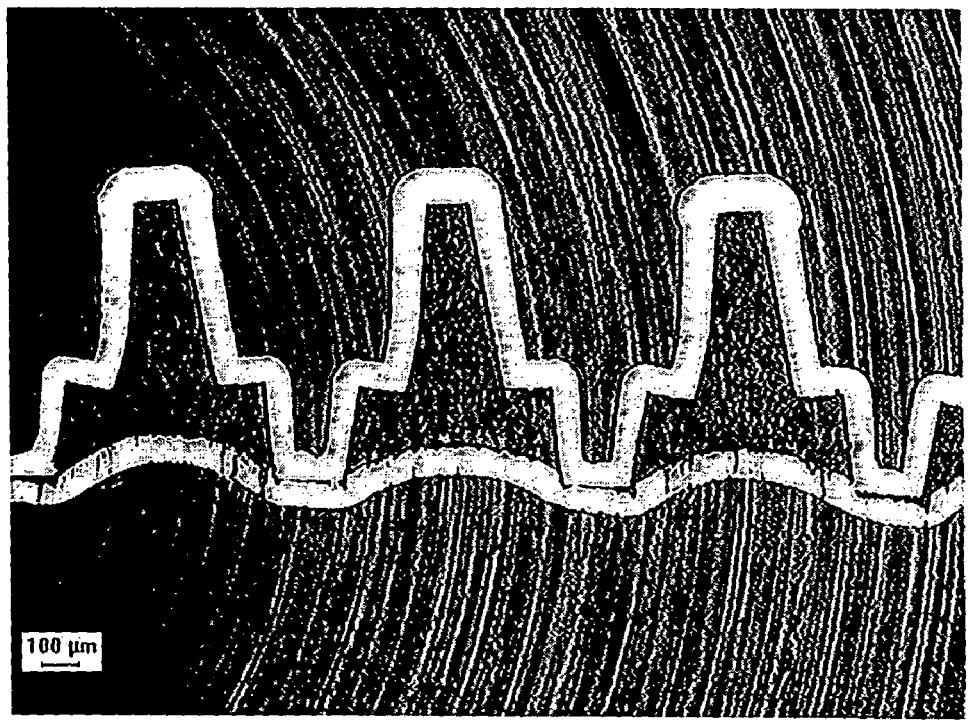
FIG. 3 is a photomicrograph of a cross section of a separator in accordance with embodiments of the present invention.

FIGS. 3-6 are photomicrographs of various views of partially or fully formed separators in accordance with embodiments of the invention. FIG. 3 is a photomicrograph of a cross section of a separator as described above. FIG. 3 illustrates a cross section cutting through a series of interconnection zones or vias. The channel and apertures in the substrate appear as discrete steps in cross section. In this example, the substrate is formed of a polymer, the first conductive layer is Ni and the second conductive layer (backside layer) is Al.

Figure 4:
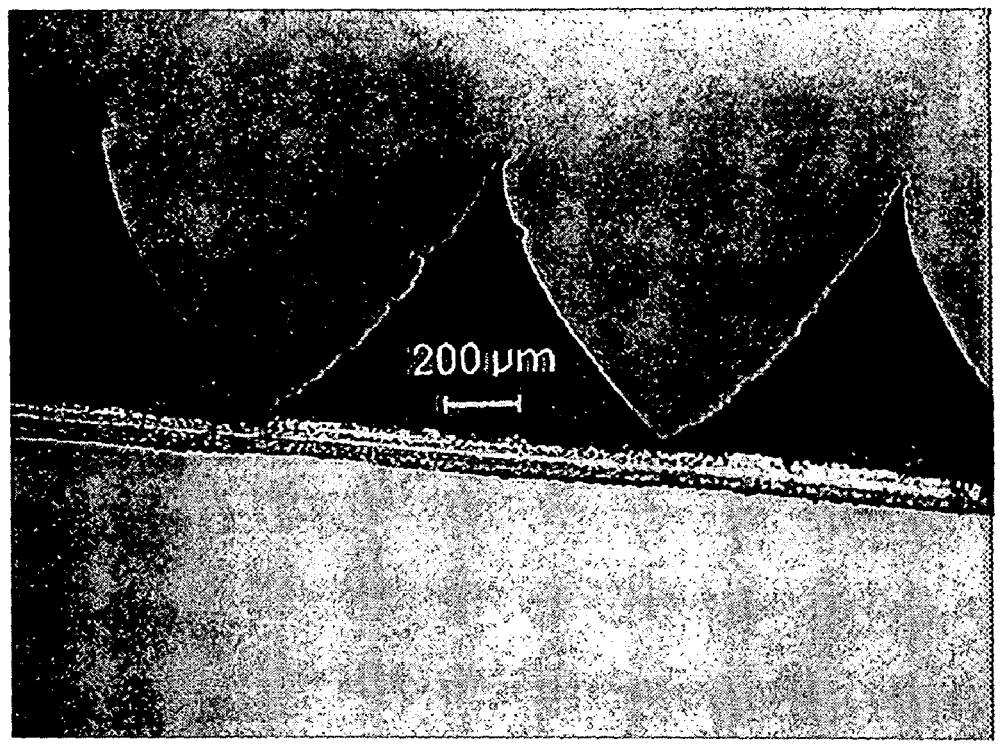
FIG. 4 illustrates a cross section of several channel/aperture features of a polypropylene substrate disposed on an aluminum base layer in accordance with embodiments of the present invention.
Figure 5:
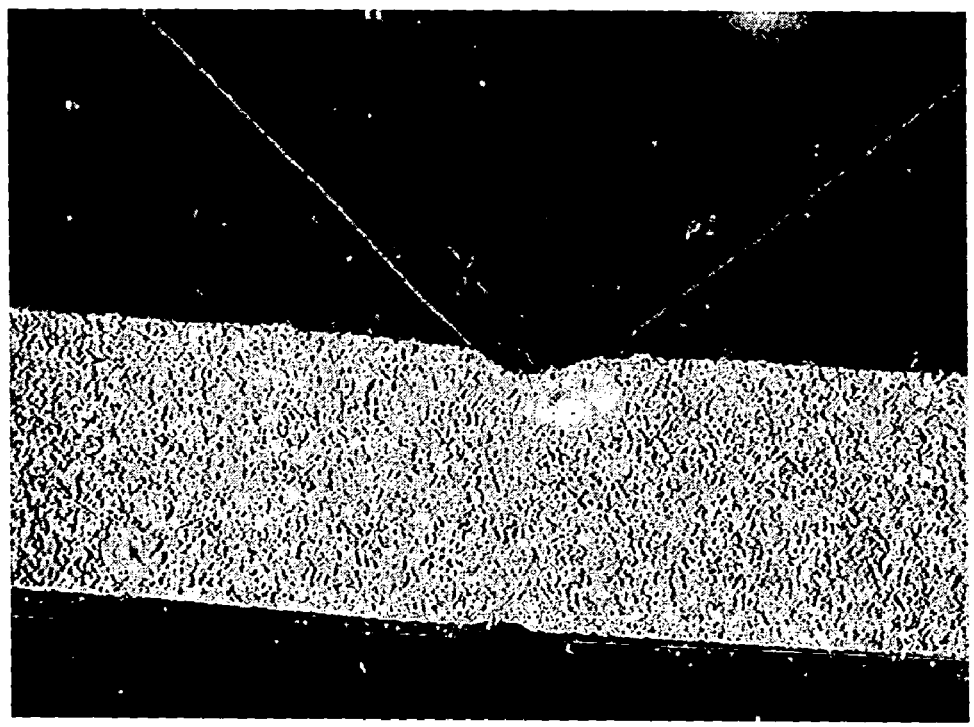
FIG. 5 is a close up view of the interface between the substrate and the aluminum base layer formed in accordance with embodiments of the present invention.
Figure 6:
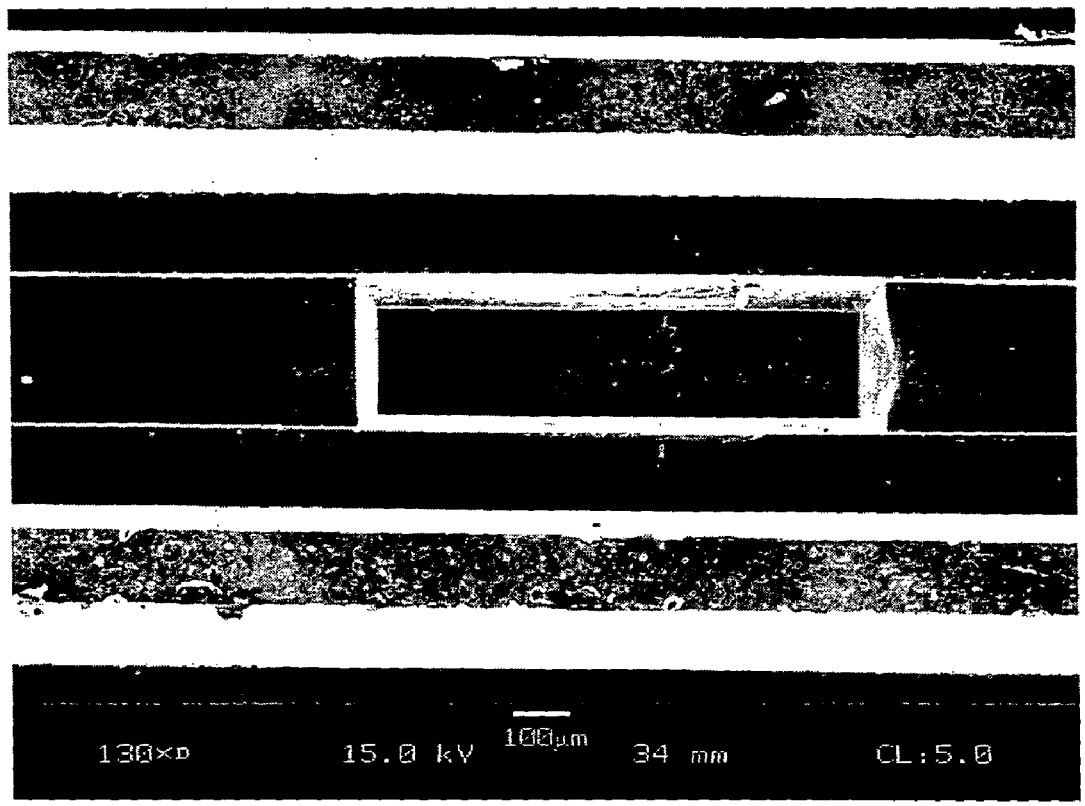
FIG. 6 is a photomicrograph of a top view of a substrate channel including an aperture formed in the substrate in accordance with embodiments of the present invention.

FIGS. 4 and 5 show a molded substrate having a different cross sectional shape than that illustrated in FIGS. 2 and 3. The molded surface of the substrate curves to form the channels and apertures. FIG. 4 illustrates a cross section of several channel/aperture features of a polymer substrate disposed on an aluminum base layer. FIG. 5 is a close up view of the interface between the substrate and the aluminum base layer. FIG. 6 is a photomicrograph of a top view of a substrate channel including an aperture formed in the substrate.

Figure 7:
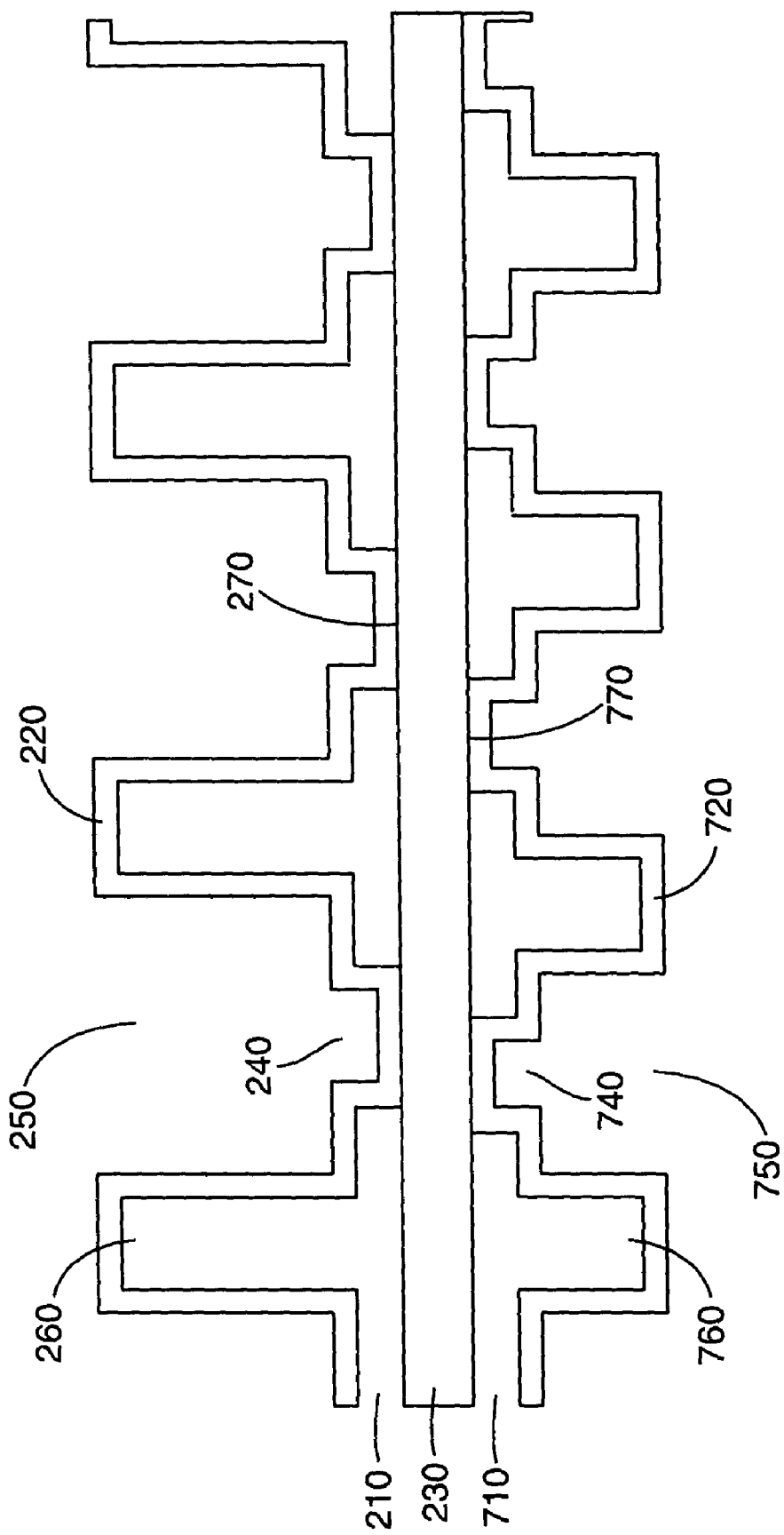
FIG. 7 illustrates a cross section of a flow field separator having cooling channels on one surface in accordance with embodiments of the present invention.

In one embodiment, illustrated in FIG. 7, the separator may include a set of channels 750 configured to contain a heat transferring fluid to further enhance the heat removing properties of the separator. As illustrated in FIG. 7, this embodiment includes a second substrate 710 defining a second set of channels 750 opposite the channels 250 defined by the first substrate 210. The first channels 250 do not need to be aligned or registered with the second set of channels 750. Similarly, the electrical connections 270 and 770 do not need to be aligned. Similarly the apertures 240 and 740 do not need to be aligned. The thinness of the separator of the present invention, in combination with the electric connections 270 and 770, also help to transfer heat from the first layer 220 side to the third layer side 720.

As illustrated in FIG. 7, the second substrate 710 is disposed on the second layer 230. A pattern of features 260, 760 formed on the surface of the first and second substrates 210, 710 form channels 250, 750 as described in connection with FIG. 2. The first substrate 210 is conformally coated with an electrically conductive first layer 220. The second substrate 710 may be conformally coated with an electrically conductive third layer 720. Apertures 240 in the first substrate allow electrical interconnection zones 270 between the first and second layers 220, 230. During operation, a heat conducting fluid may flow through the channels 750 of the second substrate 710 causing thermal energy to be carried away from the separator. The thermal energy could have a high flux rate at the points of z-axis interconnection 270 between the first layer 220 and the second layer 230.

Figure 8:
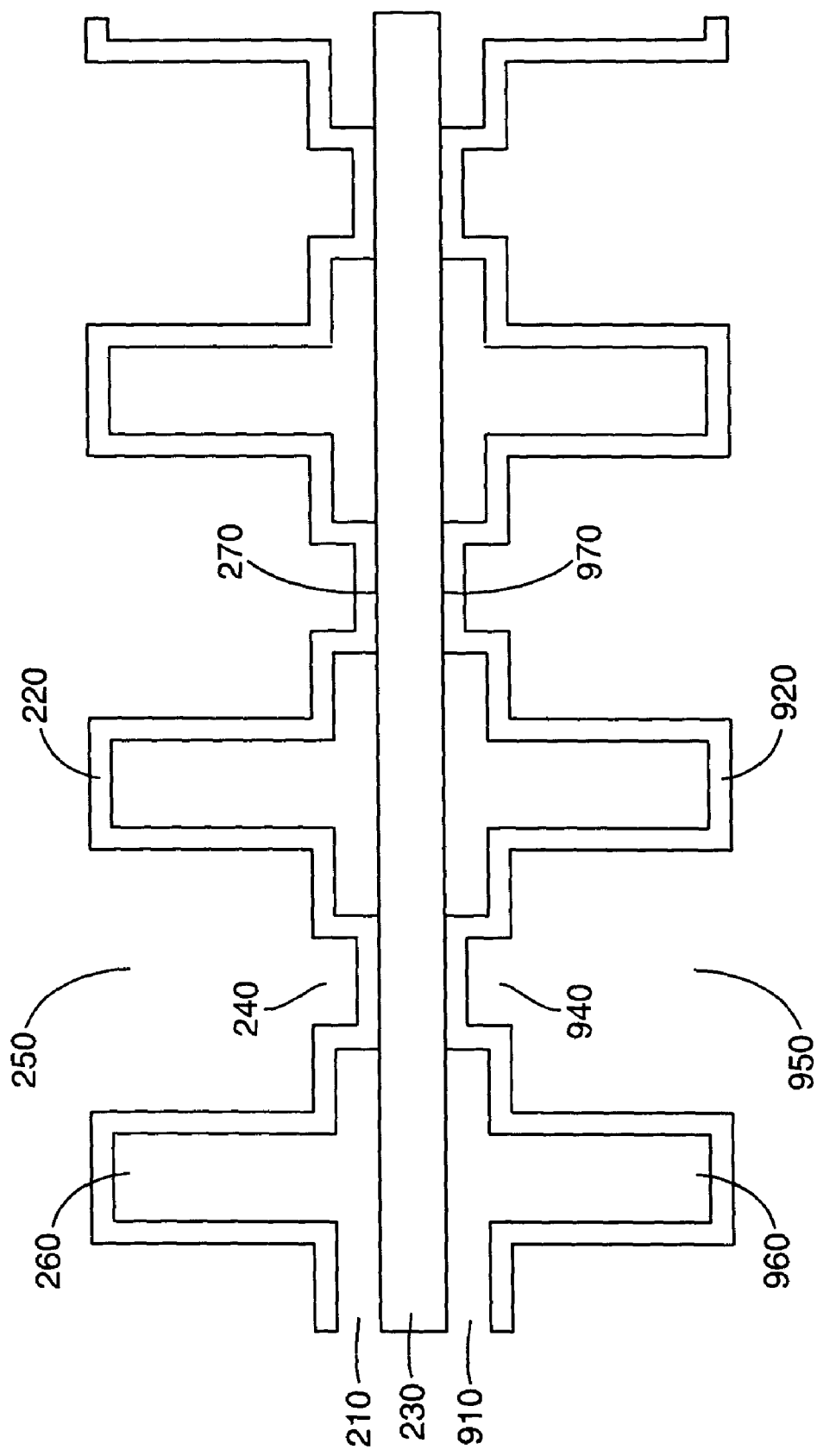
FIG. 8 is a diagram of a bipolar flow field separator in accordance with embodiments of the present invention.

Embodiments of the invention are directed to a bipolar flow field separator as depicted in FIG. 8. The bipolar flow field separator includes opposing flexible substrate layers 210, 910 disposed on a second layer 230. The first and second substrates 210, 910 include features 260, 960 forming channels 250, 950 and apertures 240, 940. A first electrically conductive layer 220 is formed on the surface of the first substrate 210 so that the first layer 220 conforms to the features 260 of the first substrate 210. The apertures in the first substrate 210 allow electrical interconnection zones 270 to be formed that electrically connect the first layer 220 to the second layer 230.

A third electrically conductive layer 920 is formed on the surface of the second substrate 910 so that the third layer 920 conforms to the features 960 of the second substrate 910. The apertures 940 in the second substrate 910 allow electrical interconnection zones 970 to be formed that electrically connect the third layer 920 to the second layer 230. In this configuration, both surfaces of the separator may be used as flow fields for reactants and/or byproducts. The separator may be utilized as a bipolar flow field film providing z-axis current flow through the film. Alternatively, the separator may be used in this configuration as a unipolar flow field film having cooling channels on one surface and reactant channels on the opposite surface with z-axis current flow through the film.

Figure 9:
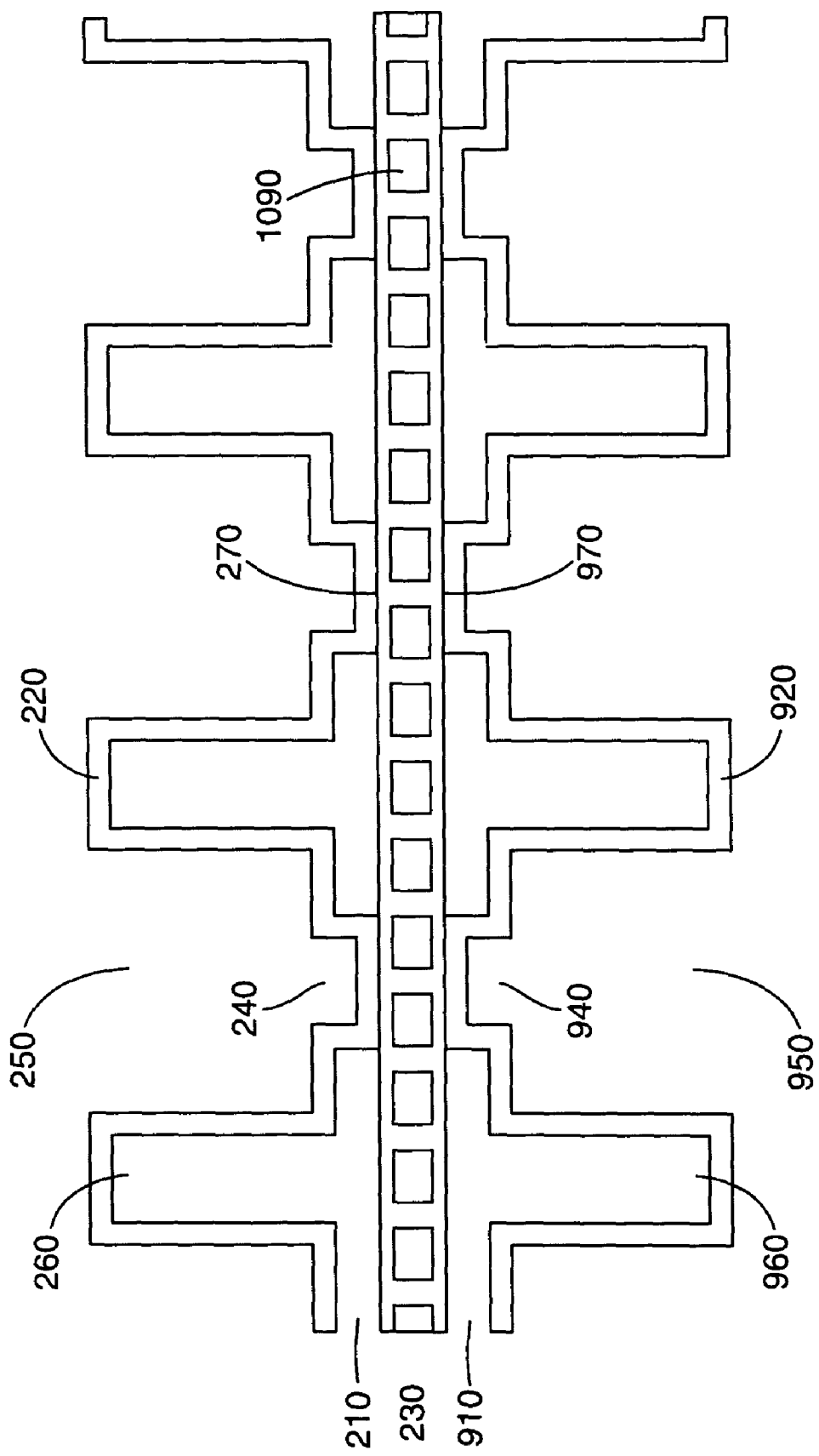
FIG. 9 is a diagram of a bipolar flow field separator having cooling internal channels in accordance with embodiments of the present invention.

An embodiment of the invention, illustrated in FIG. 9, is directed to a bipolar flow field separator having internal channels 1090 that may be used to conduct heat away from the bipolar film. In accordance with this embodiment, three distinct fluid movement regions are provided. The internal cooling channels 1090 facilitate coolant flow within the separator. Chemical reactants and/or by-products flow through the channels 250, 950 on the two outer surfaces of the bipolar separator.

In accordance with this embodiment, the second layer 230 of the separator includes channels 1090 to facilitate the flow of a coolant fluid. In this embodiment, the second layer 230 may comprise an extruded foil structure, such as an extruded aluminum foil. First and second substrates 210, 910 are formed on opposing surfaces of the second layer 230. The first and second substrates 210, 910 include features 260, 960 forming channels 250, 950 and apertures 240, 940. A first electrically conductive layer 220 is formed on the surface of the first substrate 210 so that the first layer 220 conforms to the features 260 of the first substrate 210. The apertures 240 in the first substrate 210 allow an electrical interconnection zone 270 to be formed that electrically connects the first layer 220 to the second layer 230.

A third electrically conductive layer 920 is formed on the surface of the second substrate 910 so that the third layer 920 conforms to the features 960 of the first substrate 910. The apertures in the second substrate 910 allow electrical interconnection zones 970 to be formed that electrically connect the third layer 920 to the second layer 230.

Some implementations may include optional coatings on the surface of the separator. In accordance with one embodiment, an optional anti-corrosive coating may be deposited on one or more of the first, second, and/or third layers described above. For example, an anti-corrosive layer may be employed to prevent corrosion of metals and maintain adequate area specific resistance, such as between about 0.001 ohm-cm$^2$ and about 0.1 ohm-cm$^2$ between the first, second, and/or third layers.

In accordance with another embodiment, a coating may be applied to the surface of the first, second, and/or third layers to provide reduced contact resistance. Such a coating may be used to reduce the overall electrical resistance of the separator.

In accordance with another embodiment of the invention, an adhesive coating may be applied between the substrate and the second layer.

The substrate may be made of a material that has elastomeric properties. The elastomeric substrate may allow the separator to be configured so that it provides gasketing. This embodiment is particularly useful for applications where fluid needs to be contained in certain regions of the separator. For example, in fuel cell applications, a separator may include an elastomeric substrate that functions as a gasket between the peripheral regions of the unipolar or bipolar flow field separator and an adjacent structure in the fuel cell stack. Gasket regions formed by an elastomeric substrate may be used, for example, to replace separate seals typically used in fuel cell assemblies.

Figure 10:
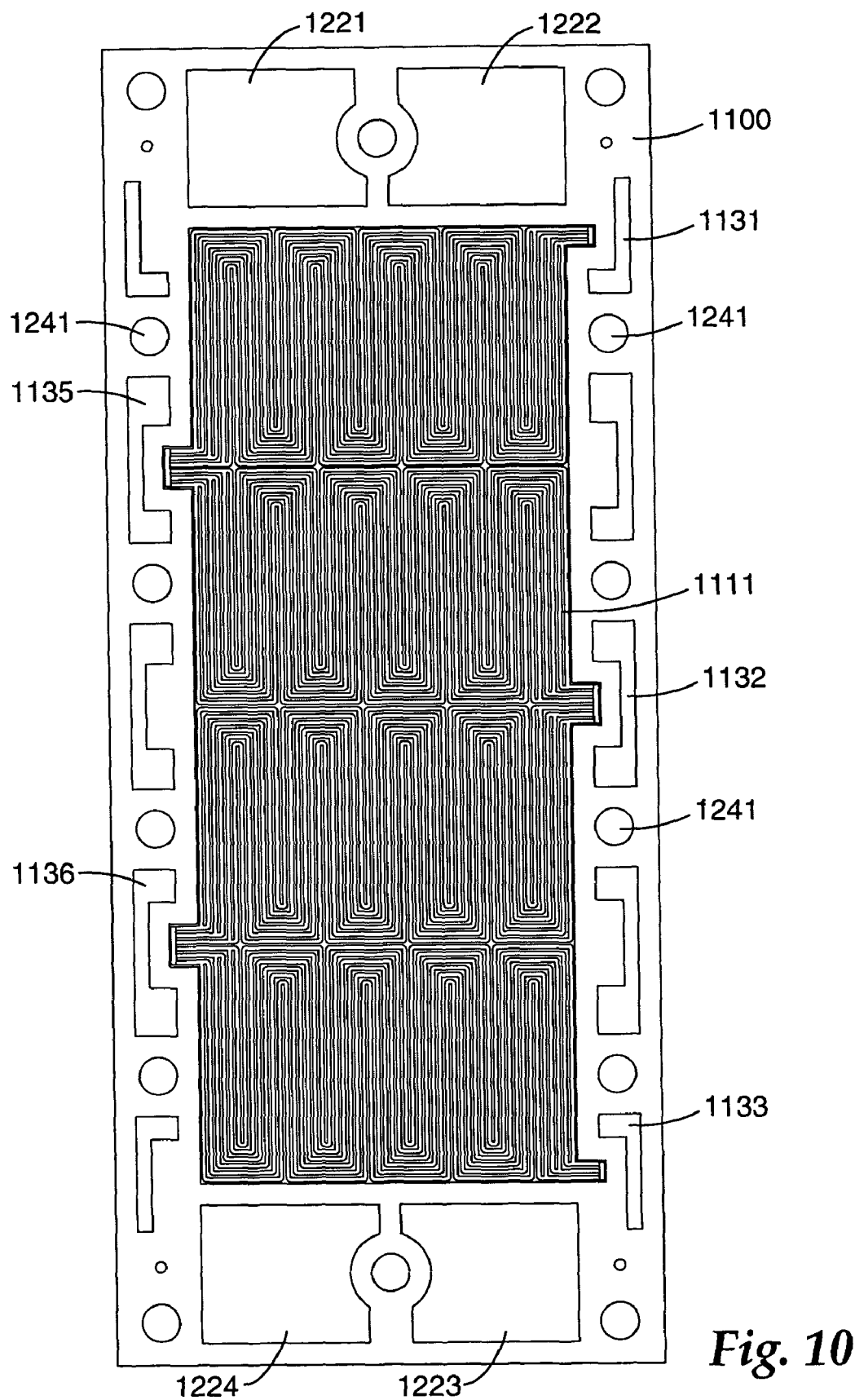
FIGS. 10 and 11 illustrate first and second surfaces of a flow field separator in accordance with embodiments of the present invention.
Figure 11:
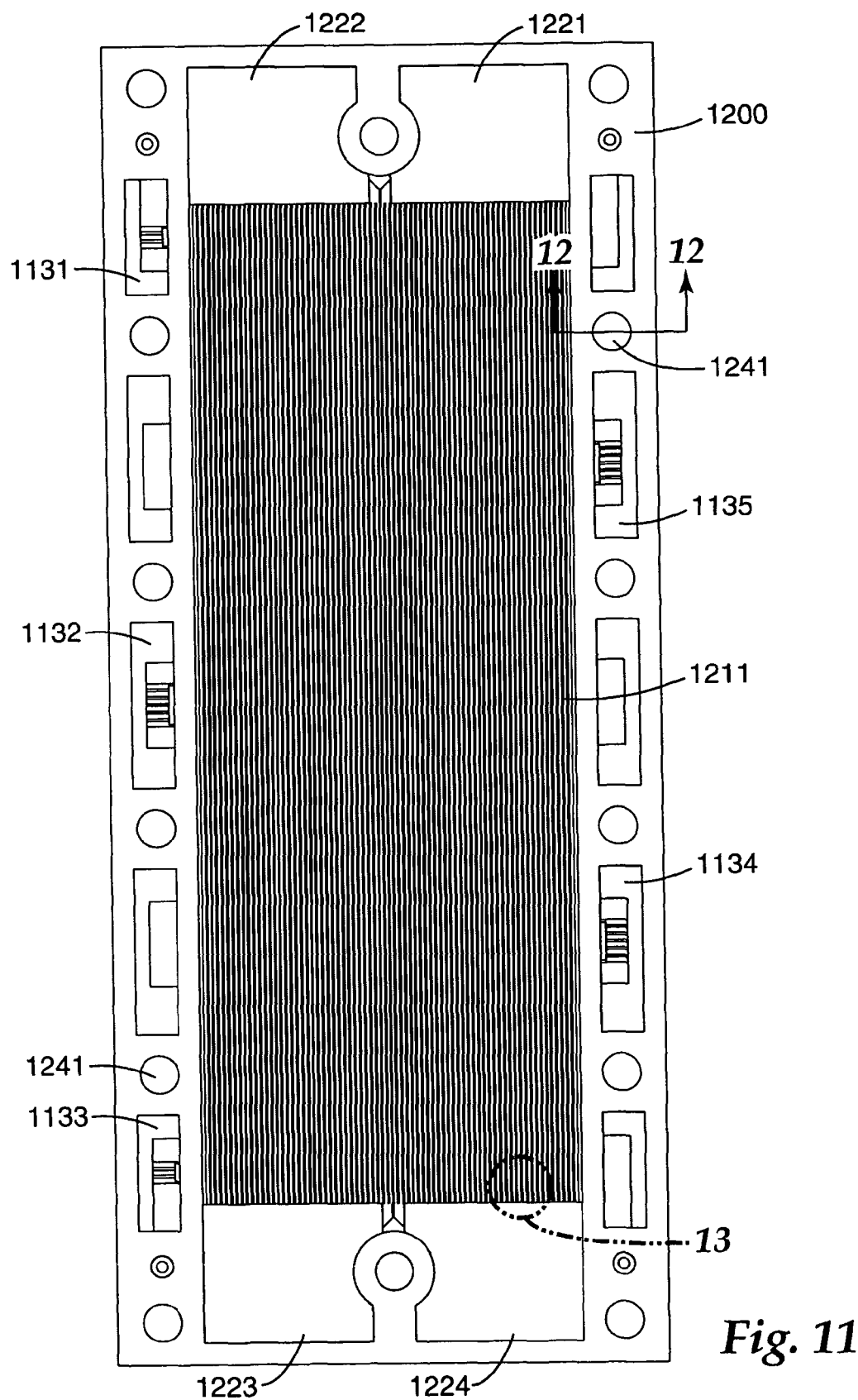
Figure 12:
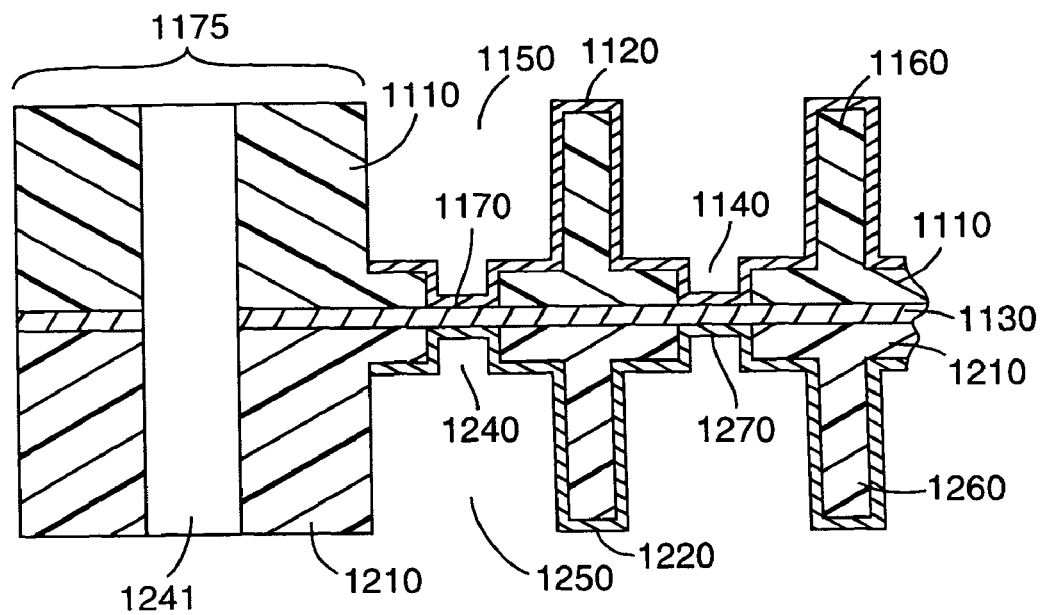
FIG. 12 illustrates a cross section of a separator taken through a connecting rod hole illustrating integral gasketing in accordance with embodiments of the present invention.

FIGS. 10 and 11 illustrate first 1100 and second 1200 surfaces of a flow field separator suitable for use as a unipolar fuel cell flow field film in accordance with embodiments of the invention. As illustrated in FIGS. 11 and 12, a first surface 1100 of the separator includes a flow field 1111 having a serpentine pattern of reactant channels. A second surface 1200 of the separator incorporates a cooling region 1211 having cooling channels. In this application, two separators of the configuration illustrated by FIGS. 11 and 12 may be arranged with a polymer electrolyte membrane (PEM) layer, diffuser/current collector (DCC) layers, anode and cathode catalyst layers sandwiched between flow field separator films to form a fuel cell unitized cell assembly (UCA).

The separator of FIGS. 11 and 12 includes surfaces configured to facilitate sealing of various regions of an UCA structure, such as regions surrounding the coolant inlet manifolds 1221, 1222, coolant outlet manifolds 1223, 1224, regions surrounding the fuel inlet manifolds 1131-1133, fuel outlet manifolds 1134, 1135, and/or the peripheral regions surrounding the connecting rod holes 1241.

As previously discussed the separator substrate may be formed of an elastomeric material that provides gasketing in regions surrounding the coolant and fuel manifolds 1131-1135, 1221-1224 and the peripheral regions surrounding the connecting rod holes 1241. Gasketing in fuel cell operations reduces the likelihood of coolant and/or fuel cell leaks that may significantly degrade the operation of the fuel cell.

FIG. 12 illustrates a cross section of a separator taken through a connecting rod hole 1241. The separator comprises a first 1110 and a second 1210 substrate having features 1160, 1260 forming channels 1150, 1250 and apertures 1140, 1240 in the first and second substrates 1110, 1210. Portions of the first substrate 1110 are disposed between a first layer 1120, which is a conformal metal layer, and a second layer 1130. The first layer 1120 contacts the second layer 1130 at interconnection zones 1170 provided by the apertures 1140 in the first substrate 1110. Portions of the second substrate 1210 are disposed between the second layer 1130 and a third conformal layer 1220. The third layer 1220 contacts the second layer 1130 at interconnection zones 1270 provided by the apertures 1240 in the second substrate 1210.

The channels 1150 of the first surface 1100 provide a flow field for the reactant fuels of the fuel cell. Liquid coolant may be dispersed through the channels 1250 of the second surface 1200 to remove heat from the active area of the fuel cell. The separator provides current collection in the z-axis via the interconnection zones 1170, 1270 that electrically connect the first and third layers.

Figure 13:
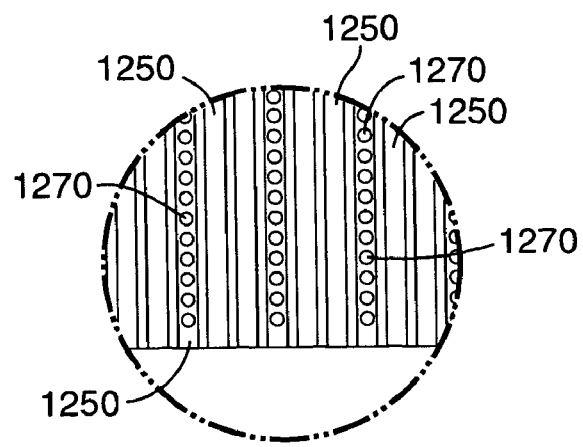
FIG. 13 is a more detailed view of a possible arrangement of interconnection zones in accordance with embodiments of the present invention.

FIG. 13 is a more detailed view of a possible arrangement of interconnection zones 1170, 1270 for the separator of FIGS. 11 and 12 as shown from the surface 1200. The interconnection zones 1170, 1270 may include a plurality of regions where the conductive first and third conformal layers make contact with the second layer that is also conductive. Such an arrangement provides a low resistance connection for current collection.

As illustrated in FIGS. 10-12, the separator may also extend beyond the flow fields 1111, 1121 to an area that encompasses the peripheral regions around the coolant and fuel manifolds 1131-1135, 1221-1224 and the connecting rod holes 1241. In accordance with an embodiment of the invention, first and second substrates 1110, 1210 may be formed of an elastomeric material that facilitates gasketing for one or more of these peripheral areas. The substrate 1110, 1210 in the peripheral region may be made thicker than in the flow field regions to form a compressible gasket. As illustrated in FIG. 12, the substrate 1110, 1210 need not include the first and third conformal layers in the peripheral region 1175.

Figure 14:
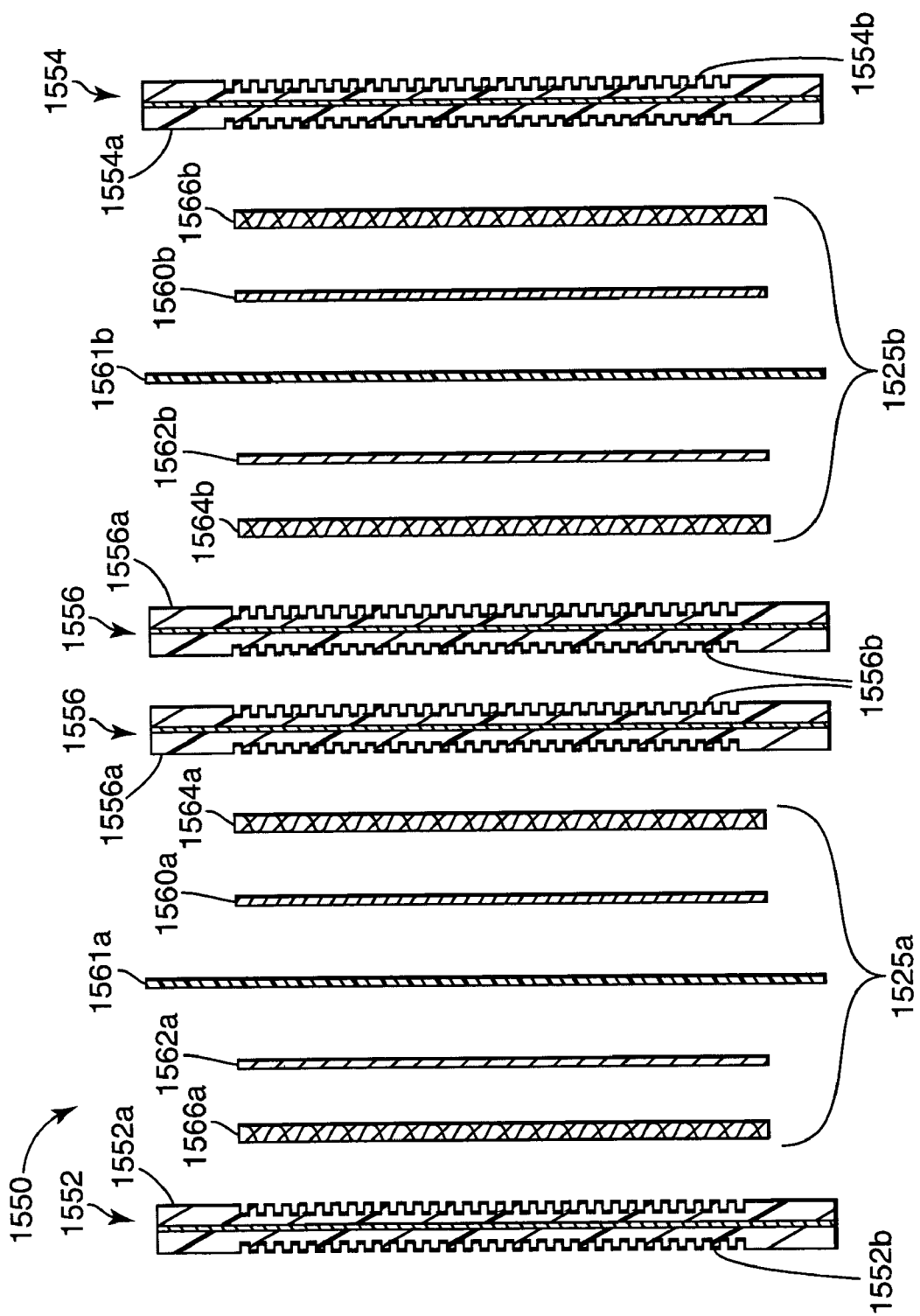
FIG. 14 illustrates a unitized cell assembly for fuel cell applications in accordance with embodiments of the invention having two MEA's.

FIG. 14 illustrates a unitized cell assembly (UCA) 1550 for fuel cell applications in accordance with embodiments of the invention. The UCA 1550 incorporates multiple MEAs 1525a and 1525b through employment of one or more unipolar flow field films 1552, 1556, 1554. In the configuration shown in FIG. 14, UCA 1550 incorporates two MEAs 1525a and 1525b and four unipolar flow field films 1552, 1554, 1556. The unipolar flow field films 1556 incorporate cooling channels on one surface 1556b. Alternatively, the two unipolar flow field films 1556 may be replaced by a bipolar flow field film having internal cooling channels as discussed herein. The UCA may be held together by any suitable method or mechanism, including that described in U.S. patent application Ser. No. 11/025,267, incorporated herein by reference.

MEA 1525a includes a cathode 1562a/membrane 1561a/anode 1560a layered structure sandwiched between diffuser/current collector (DCCs) 1566a and 1564a. DCC 1564a is situated adjacent a first flow field surface 1556a of unipolar flow field film 1556. The second flow field surface 1556b of the unipolar flow field film 1556 comprises cooling channels. DCC 1566a is situated adjacent a flow field film 1552, which may be configured as a unipolar flow field film or a bipolar film. If the flow field film 1552 is configured as a unipolar flow field film, then one surface 1552a may comprise a reactant flow field and a second surface 1552b may comprise a coolant flow field.

MEA 1525b includes a cathode 1562b/membrane 1561b/anode 1560b layered structure sandwiched between diffuser/current collector (DCCs) 1566b and 1564b. DCC 1564b is situated adjacent a first flow field surface 1556a of unipolar flow field film 1556. The second flow field surface 1556*b* of the unipolar flow field film 1556 comprises cooling channels. DCC 1566*b* is situated adjacent a flow field film 1554, which may be configured as a unipolar flow field film or a bipolar film. If the flow field film 1554 is configured as a unipolar flow field film, then one surface 1554*a* may comprise a reactant flow field and a second surface 1554*b* may comprises a coolant flow field.

Multiple UCAs of the construction illustrated in FIG. 14 may be joined by polymer welds to form a fuel cell stack. Other suitable joining means include clips, screws, adhesives, epoxies, mechanical interference as exemplified by snap-lock or DUAL-LOCK™, locking tapers, and the like.

The fuel cell stack is formed by compressing multiple UCAs that have been aligned to facilitate sealing between UCAs and/or UCA components. For example, the fuel cell stack may be aligned and compressed using connecting rods that pass through peripheral portions of the UCAs and apply a predetermined pressure to the stack. One or more components of the UCAs may include registration features that serve to align the UCAs during the compression process. As discussed herein, the separators may provide gasketing for the UCAs, or separate gaskets, as shown in FIG. 1*b*, may be employed to enhance sealing of the stack.

One embodiment of the invention involves a method for replacing a UCA in a fuel cell stack. In one example, replacement of a UCA of a fuel cell stack may be desired if the UCA is determined to be faulty. A UCA may be faulty if it contains one or more underperforming MEA's, for example. In this scenario, the compression is removed from the UCAs of the fuel cell stack, such as by loosening the nuts of the connecting rods. The faulty UCA is then removed and a replacement UCA is inserted in the stack. Compression is reapplied to the fuel cell stack.

During the compression process, the UCA components are maintained in correct alignment. Correct alignment may be maintained, for example, by registration features of one or more components of the UCAs. Compression of the fuel cell stack may involve tightening the connecting rod nuts in a predetermined sequence and to a predetermined pressure to enhance even compression across the fuel cell surfaces.

In accordance with one embodiment, a method for making a flexible flow field separator involves placing a second surface of a polymeric substrate layer in contact with a second layer of a flexible, electrically conductive material, such as an aluminum foil. The second layer and/or the substrate may comprise one or more films. In some embodiments, the substrate may be formed of a polymer film such as polypropylene or polycarbonate, and the second layer may be formed of an aluminum foil or film. A structured flow field pattern is formed on a first surface of the substrate. The first surface of the substrate is coated with a first layer of electrically conductive material, for example, nickel. The first layer contacts the second layer at one or more locations so that electrical conductivity is established between the first and the second layers.

Formation of the flow field pattern may be accomplished by subjecting the substrate layer to a molding process to form structured features, e.g., channels and apertures, on the surface of the substrate. Typical methods include compression molding, injection molding, extrusion embossing, extrusion coating, and cast and curing. The materials used to form the substrate layer(s) could be a thermoplastic polymer, polymer composite, or a curable polymer resin formulation. Typical structure features include V shaped ribs, flat topped ribs, and possibly posts or discontinuous ribs. The design of the structure is dependent on the needs of the fuel cell. Typical channel depths range from about 1 mil to 100 mil, and more preferably from about 3 mil to 50 mil. The ribs could have sharp tips, or they could have rounded tips, or even flat tips.

In some embodiments, the substrate is molded or laminated to form the pattern and the first layer is deposited over the pattern. In other embodiments, the first layer is deposited on the smooth substrate and the layered structure is embossed in a compression mold to form the pattern. The molding or laminating of the substrate may be performed before or after the substrate is placed on the second layer.

The separator may be fabricated so as to have flow fields on one or both surfaces of the separator. In one embodiment, a flow field on a first surface of the separator may be used for the transport of reactants and/or byproducts and a flow field on a second surface of the separator may be used for liquid or gaseous coolant. A separator utilizing a reactant flow field on one surface of the separator and a coolant flow field on the opposite surface may be implemented as a fuel cell unipolar flow field film with integral cooling.

In another embodiment, flow fields on both sides of the separator may be utilized as a bipolar flow field separator.

A bipolar flow field separator having reactant flow fields on both surfaces and a unipolar flow field separator with a reactant flow field on one surface and coolant channels on another surface may be made using a similar method. The method of making such structures in accordance with embodiments of the invention, involves placing first and second polymeric substrates on first and second surfaces of the second layer. Structured flow field patterns are formed on the surface of the first substrate and the surface of the second substrate. A first layer is deposited on the surface of the first substrate. A third layer is deposited on the surface of the second substrate.

In accordance with various embodiments, electrical interconnections between the first and second layers and/or the third and second layers may be established via one or more discrete conductivity paths or zones between the first and second layers. For example, apertures may be formed in one or both the first and the second substrates and the electrical interconnection between the first and the second layers and/or the third and second layers is established through the one or more substrate apertures. The apertures may be formed as part of the laminating or molding process discussed above, or may be formed by laser processing, perforation, or cutting with a mechanical tool.

The first layer may comprise one or more metals and may be disposed on the substrate before or after pattern formation. The first layer can be deposited on the first surface of the substrate by a variety of processes, including, for example, electroplating, vapor deposition, sputtering, or other coating techniques.

In some embodiments, the first layer may comprise a multi-layered structure. The first layer may be formed by depositing a first sub-layer on the substrate by one deposition process and depositing a second sub-layer on the first sub-layer by a different deposition process. The first and second sub-layers may comprise the same metal or the first sub-layer may comprise a different metal than that of the second sub-layer.

In one example, the first sub-layer may be formed by vapor deposition of nickel on the substrate. The second sub-layer may be formed by electroplating nickel on the first sub-layer. In this example, the first sub-layer may comprise a relatively thin layer and the second sub-layer may form the bulk of the first layer. In another example, the first sub-layer may be formed by vapor deposition of copper on the substrate and the second sub-layer may be formed by vapor deposition of nickel on the copper sub-layer.

Additional layers may be disposed on the first layer and/or the second layer. In one example, an additional layer may comprise a thermally conductive layer. In another example, the additional layer may comprise a layer that reduces the resistivity of the base layer. In yet another example, the additional layer comprises a corrosion resistant layer.

The second layer may be a metal foil, such as aluminum or other metal. In one scenario, the second layer may be extruded so as to form a plurality of internal channels within the metal foil. The internal channels may be used for coolant flow through the channels. A separator having the internal channel and flow fields on each surface provides areas for the movement of three fluids across the surface and/within the separator. The separator may include inlet and outlet ports for movement of reactants, byproducts, coolant, and/or other substances to and from the flow fields on the surface and internal to the separator.

The separators described herein are flexible and may be made using continuous processing techniques. The flexible separators described herein may be made as discrete components or as a plurality of components on a continuous roll.

EXAMPLES

In these examples, the channels were formed from polypropylene and the flat backside metallic layer is composed of Aluminum, and the front side conformal layer is made of Nickel. The samples were produced by embossing a tool into the aluminum foil and polypropylene, forming channels with exposed aluminum at the channel base. The foils were then Ni vapor coated, and then another layer of galvanically formed Ni was deposited onto the Ni vapor coat. The samples were then tested for current carrying capacity, resistance, and fuel cell performance.

Example 1

A 3 mil polypropylene coated aluminum foil (identified as RJR foil, KW384-116, ID003,) from RJR Packaging, Winston-Salem, N.C. was used as a conductive material base for the separator of this example. Next two 8 mil thick layers of a super high impact ethylene/propylene copolymer SRD 7-560, (30 MFI) from Shell Chemical Company (Houston Tex.), were placed on the polycoated Al foil, and then pressed in a Wabash Vantage press, model V75H-24-CLX, using a V-groove tool described below as pattern 1. The pressing conditions used were as follows:

Step 1; place the tool, polypropylene layers, Al foil, and a chrome plated press plate into the press, which was preheated to 175C. The inner platen control was set to 175C, and the outer platens were set to 150° C. The press was closed and clamped at 20 psi. This condition was maintained for 5 minutes.

Step 2: The temperature was maintained at 175C, and the pressure was increased to 200 psi. This condition was held for 10 minutes.

Step 3: The pressure remained at 200 psi, and the water cooling was turned on. The press was opened when the platen thermocouples indicated a temperature of between 40C-50C.

Step 4: The sample was removed from the press and then stripped off the tool. An example of what the aluminum and polypropylene interface looked like after Step 4 is provided in the photomicrographs of FIGS. 4 and 5.

The next step was to put a conductive layer on the polypropylene, to connect the microstructured side to the Al foil. The films were vapor coated with Ni, with an oxygen glow discharge step, followed by Ni vapor coating. The multi-step process for depositing the electrically conductive Ni layer used a diffusion pumped DVB44 Denton box coater (Denton Vacuum, Cherry Hill, N.J.). First the vacuum chamber was pumped down to $2.0 \times 10^{-6}$ Torr. Next, the hi-vac valve was closed, the bypass valve was opened and feeding of 20 sccm of oxygen was begun. The bypass valve was throttled to achieve a chamber pressure of 4 mTorr. The web was pretreated for 10 minutes to attain good Ni adhesion using the oxygen plasma source set at 400 milliamps. The oxygen valve and bypass valve were closed and the hi-vac valve opened to attain a chamber pressure of $2.0 \times 10^{-6}$ Torr. A 750 angstrom layer of Ni was deposited with a electron beam evaporation process at 3 angstroms per second. This process was repeated on the opposite side of the web. Finally the film was placed in a Ni plating tank, and Ni was deposited on the film surface at a rate of 0.001" of Ni/hr. The 600 angstrom layer was conformal and uniform in nature and made electrical contact to the exposed Al foil at the channel base. Step 4: The sample was removed from the press and then stripped off the tool. An example of what the aluminum and polypropylene interface looked like after Step 4 is provided in the photomicrographs of FIGS. 4 and 5.

Example 2

In this example the conditions were identical to Example 1, except the Ni tooling used to for the channels and electrical contacting zones were produced using a tool with a rectangular channel described below as pattern 2. Discrete holes in-the substrate were created, where current could flow from the front surface to the back surface. FIG. 6 illustrates an aperture cut in the substrate by the tool.

Example 3

For example 3, the conditions and tooling were identical to example number 1, except the Al foil used was a 4 mil dead soft aluminum foil, that had a polymer coating on only one side, leaving the back side of the Al foil (non-structured side) uncoated. The foil was a cold form PP firmpak from HUECK FOLIEN GmbH & Co. KG Pirkmühle 14-16 D-92712 Pirk, lot number 1020007.

Tooling descriptions:
Tool Pattern 1: V-groove pattern with 90° tip, and 20° notch, with 41.24 mil pitch, and 30 mil channel depth. The 90° tip had a 0.8 mil radius. The V-groove walls curved to fit to the 20° base angle and the 90° tip angle.
Tool Pattern 2: Rectangular channel pattern with 20 mil tall channels. The channels have a top width of 20 mil, and a base width of 25.62 mil. The channels are on a 30.62 mil pitch. The channel walls are straight. On top of the channels are rectangular posts. The posts are 9 mil tall, 6.8 mil wide and 41 mil long (in the channel direction). The posts have a 0.35 inch (0.89 cm) pitch, in the channel direction, and a 30.62 mil pitch in the cross channel direction (each channel has posts). The posts align with each other in the cross channel direction.

A toughness test was conducted, to compare the toughness of a separator formed in accordance with embodiments of the invention to a composite graphite plate. The toughness test measures the resistance of the material to catastrophic breakage. Three samples of an aluminum/polypropylene/nickel layered separator formed in accordance with embodiments of the present invention were tested for toughness using the process described below. The separator comprised an aluminum first layer, a polypropylene substrate, and a nickel first layer, having an overall thickness of about 0.144 cm thick. The mean bulk density of the aluminum/polypropylene/nickel layered separator samples used in the toughness test was about 3 gm/cm$^3$. The aluminum/polypropylene/nickel layered separator used in the toughness testing is represented in FIG. 7. The first and second substrates were made separately, and then laminated to the second layer. The first and second substrates were first produced by compression molding polypropylene copolymer 7C50 (Dow Chemical, Midland, Mich.), against a stainless steel tool to form the channel walls. The first substrate had 30 mil deep channels, with a pitch of 84 mil. The first substrate channels were serpentine channels that had a 7.1 cm wide traverse, making 13 traverses going across the 11.1 cm width of the channel area. There were four sections of traversing channel, covering the 28.45 cm length of the channel area. The second substrate had 10 mil deep channels, with a pitch of 95 mil, running the length of the substrate. The channels area was 11.1 cm wide by 29.01 cm long. The pressing conditions used were the same as example 1 except that the clamping of step 1 was done at 50 psi and the pressure of step 2 and 3 was 300 psi. The first and second substrates were then laminated to a 3 mil polypropylene coated aluminum foil (identified as RJR foil, KW384-116, ID003,) from RJR Packaging, Winston-Salem, N.C., using 3M VHB Tape F-9460 (3M Company, St. Paul Minn.), a 2 mil thick adhesive transfer tape. Next, vias were drilled in the channel base, by drilling down to the Al foil using a 266 nm laser. The vias were 20 mil in diameter, and there were 72 vias/in$^2$. The next step was to put a conductive layer on the polypropylene, to connect the microstructured side to the Al foil. This step was done as in example 1.

The toughness of the aluminum/polypropylene/nickel layered separator samples was compared to three samples of a graphite composite separator used as a control. The graphite separator samples was molded from BMC 940-8649 composite vinyl ester bulk molding compound commercially available from Bulk Molding Compounds, Inc., West Chicago, Ill. The graphite separator had a thickness of about 0.267 cm, mean bulk density of about 2 gm/cm$^3$, with dimensions of about 15 cm×15 cm prior to cutting. For comparison, a titanium separator typically has a mean bulk density of about 4.5 gm/cm$^3$, and the mean bulk density of a typical stainless steel separator is around 7.9 gm/cm$^3$.

The samples were cut from larger pieces that were one inch (2.54 cm) wide. The graphite composite was cut using a band saw, to make a sample one inch in width (2.54 cm) and approximately 6 inches (15.24 cm) in length. The aluminum/polypropylene/nickel layered separator was cut using a scissors.

Each sample was scribed in a straight line across the width of the sample using a sharp diamond tool. The scribe line was cut approximately two inches from the end of the sample. The sample was then placed on an aluminum plate, with the scribe line facing downward. An aluminum block was then placed on top of the sample, such the end of the block was parallel to, and even with the scribe line. The block on top was square in cross section. The block was then pressed against the sample and aluminum plate using a hydraulic press, with light pressure to hold the block against the sample.

The sample was then lifted off of the aluminum plate, and the height of the sample three inches from the scribe line was measured at the point of sample breakage. The angle at breakage was recorded, or was recorded as 90 degrees if the sample did not break, but was able to bend until the sample was bent up to the aluminum block. Larger angles represent samples that exhibit more toughness and ductility.

The toughness tests results were as follows:

| Graphite separator | |
|---|---|
| Sample 1: | 5.95 degrees |
| Sample 2: | 3.58 degrees |
| Sample 3: | 3.58 degrees |
| Aluminum/Polypropylene/Nickel separator | |
| Sample 1: | 90 degrees (no breakage) |
| Sample 2: | 90 degrees (no breakage) |
| Sample 3: | 90 degrees (no breakage) |

As discussed above, the separator of the present invention may be used to form bipolar or unipolar flow field separators that are particularly useful in fuel cell applications. The separators described herein provide a cost-effective way to transport reactants, reactant by-products, and coolant while allowing z axis current conduction through the separator. In some embodiments, the separator provides three distinct fluid regions, which may be used to accommodate cooling, and two reactant streams. The flexible structure of the separator allows for the formation of integral gasket regions.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What we claim is:

1. A flexible flow field separator, comprising:
    a substrate layer formed of a flexible material and having first and second surfaces;
    a structured flow field pattern defined on the first surface of the substrate layer, the structured flow field pattern defining one or more fluid channels;
    a first layer formed of an electrically conductive material and disposed on the first surface of the substrate layer;
    a second layer disposed on the second surface of the substrate layer, the second layer formed of a flexible electrically conductive material, wherein the second layer comprises a first surface and a second surface, the first surface contacting the second surface of the substrate layer;
    a second substrate layer formed of a flexible material and having first and second surfaces, the second surface of the second substrate layer contacting the second surface of the second layer; and
    a second structured pattern defined on the first surface of the second substrate layer, the second structured pattern defining one or more fluid channels; and
    a third layer formed of an electrically conductive material and disposed on the second substrate layer;
    wherein the first layer contacts the second layer at one or more locations to define an electrical connection between the first and second layers; wherein the substrate layer is formed from a substantially electrically non-conductive material or a material having an electrical conductivity substantially less than that of the electrical connection defined between the first and second layers; and
    wherein the second substrate layer is formed from a substantially electrically non-conductive material or a material having an electrical conductivity substantially less than that of the electrical connection defined between the second and third layers.

2. The separator of claim 1, further comprising an adhesive layer disposed between the second layer and the substrate layer.

3. The separator of claim 1, further comprising an adhesion promoting layer disposed between the first layer and the substrate layer.

4. The separator of claim 3, wherein the adhesion promoting layer comprises a sputtered metallic layer.

5. The separator of claim 1, wherein the substrate layer is formed from one or more films.

6. The separator of claim 1, wherein the structured flow field pattern defines an embossed structured flow field pattern provided on the first surface of the substrate layer.

7. The separator of claim 1, wherein:
the substrate layer comprises one or more films;
the second layer comprises one or more films or foils; and
the first layer defines an electrically conductive coating formed of one or more metals.

8. The separator of claim 1, wherein the substrate layer is formed from a polymer material.

9. The separator of claim 8, wherein the polymer is polycarbonate.

10. The separator of claim 1, wherein the substrate layer is formed from a substantially electrically non-conductive material.

11. The separator of claim 1, wherein the substrate layer is formed from a material having an electrical conductivity substantially less than that of the electrical connection defined between the first and second layers.

12. The separator of claim 1, wherein the substrate layer comprises one or more apertures, and the electrical connection between the first and second layers is established via the one or more apertures.

13. The separator of claim 1, wherein the second layer is formed from one or more films or foils.

14. The separator of claim 1, wherein the second layer comprise a foil of aluminum.

15. The separator of claim 1, wherein the first layer comprise a coating of nickel.

16. The separator of claim 1, wherein the electrical connection between the first and second layers provides for an area specific resistance of between about 0.001 ohm-cm$^2$ and about 0.1 ohm-cm$^2$.

17. The separator of claim 1, wherein the second layer comprises a channel configured to permit passage of a coolant through the channel.

18. The separator of claim 1, wherein the second layer comprises an extruded foil structure comprising a channel configured to permit passage of a coolant through the channel.

19. The separator of claim 1, wherein the substrate layer comprises a channel configured to permit passage of a coolant through the channel.

20. The separator of claim 1,
wherein the third layer contacts the second layer at one or more locations to define an electrical connection between the third and second layers.

21. The separator of claim 20, wherein the second layer comprises a channel configured to permit passage of a coolant through the channel.

22. The separator of claim 20, wherein the second layer comprises an extruded foil structure comprising a channel configured to permit passage of a coolant through the channel.

23. The separator of claim 20, wherein at least one of the substrate layer and second substrate layer comprises a channel configured to permit passage of a coolant through the channel.

24. The separator of claim 1, further comprising a corrosion resistant layer disposed on at least a portion of one or both of the first and second layers, the corrosion resistant layer comprising an electrically-conductive, corrosion-resistant material.

25. A continuous roll comprising a plurality of the separators according to claim 1.

26. The separator of claim 1, wherein a plurality of the separators are incorporated in a unitized cell assembly (UCA).

27. The unitized cell assembly of claim 26, wherein a plurality of the unitized cell assemblies comprising the separator of claim 1 are incorporated in a fuel cell stack.

28. The unitized cell assembly of claim 26, wherein a plurality of the separators of claim 1 are joined by a polymer weld.

29. The unitized cell assembly of claim 26, wherein a plurality of the unitized cell assemblies are incorporated in a fuel cell stack.

30. The unitized cell assembly of claim 26, wherein a plurality of the separators of claim 1 are joined by a mechanical interference.

* * * * *

UNITED STATES PATENT AND TRADEMARK OFFICE
CERTIFICATE OF CORRECTION

Page 1 of 1

PATENT NO. : 7,862,956 B2
APPLICATION NO. : 11/025246
DATED : January 4, 2011
INVENTOR(S) : Raymond Patrick Johnston It is certified that error appears in the above-identified patent and that said Letters Patent is hereby corrected as shown below:

Column 7
Line 13; delete "MEA" and insert -- MEA 25 -- therefor.

Column 9
Line 13; delete "GRAPHOIL" and insert -- GRAFOIL -- therefor.

Column 17
Line 30; delete "vias/in$^2$ ." and insert -- vias/in$^2$. -- therefor.

Signed and Sealed this
Eighth Day of March, 2011

David J. Kappos
*Director of the United States Patent and Trademark Office*